United States Patent
Chen et al.

(10) Patent No.: US 11,494,612 B2
(45) Date of Patent: Nov. 8, 2022

(54) SYSTEMS AND METHODS FOR DOMAIN ADAPTATION IN NEURAL NETWORKS USING DOMAIN CLASSIFIER

(71) Applicant: Sony Interactive Entertainment Inc., Tokyo (JP)

(72) Inventors: Ruxin Chen, San Mateo, CA (US); Min-Hung Chen, San Mateo, CA (US); Jaekwon Yoo, San Mateo, CA (US); Xiaoyu Liu, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 841 days.

(21) Appl. No.: 16/176,812

(22) Filed: Oct. 31, 2018

(65) Prior Publication Data

US 2020/0134424 A1  Apr. 30, 2020

(51) Int. Cl.
*G06N 3/04* (2006.01)
*G06N 3/08* (2006.01)

(52) U.S. Cl.
CPC ............. *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 9,020,870 B1 | 4/2015 | Daily et al. | |
| 9,460,711 B1 | 10/2016 | Vanhoucke et al. | |
| 9,807,473 B2 | 10/2017 | Mei et al. | |
| 2016/0078359 A1* | 3/2016 | Csurka | G06K 9/6215 706/12 |
| 2017/0024641 A1 | 1/2017 | Wierzynski | |
| 2017/0083829 A1 | 3/2017 | Kang et al. | |
| 2017/0148431 A1 | 5/2017 | Catanzaro et al. | |
| 2017/0148433 A1* | 5/2017 | Catanzaro | G06N 3/084 |
| 2017/0357896 A1* | 12/2017 | Tsatsin | G06N 3/084 |
| 2018/0024968 A1* | 1/2018 | Clinchant | G06N 3/0454 706/12 |
| 2018/0144465 A1 | 5/2018 | Hsieh et al. | |
| 2018/0268292 A1 | 9/2018 | Choi et al. | |
| 2019/0046068 A1* | 2/2019 | Ceccaldi | G06K 9/6271 |
| 2020/0034998 A1 | 1/2020 | Schlemper et al. | |

FOREIGN PATENT DOCUMENTS

WO  2018109505 A1  6/2018

OTHER PUBLICATIONS

Tzeng et al. Adversarial Discriminative Domain Adaptation (Feb. 17, 2017) (Year: 2017).*
Ashmore, S. Evaluating the Intrinsic Similarity between Neural Networks (2015) (Year: 2015).*
Csurka, G. Domain Adaptation for Visual Applications: A Comprehensive Survey (Mar. 30, 2017) (Year: 2017).*

(Continued)

*Primary Examiner* — Ann J Lo
*Assistant Examiner* — Van C Mang
(74) *Attorney, Agent, or Firm* — John L. Rogitz; John M. Rogitz

(57) ABSTRACT

A domain adaptation module is used to optimize a first domain derived from a second domain using respective outputs from respective parallel hidden layers of the domains.

19 Claims, 13 Drawing Sheets

(56) References Cited

OTHER PUBLICATIONS

Chen et al. Large-Scale Visual Font Recognition (2014) (Year: 2014).*
Ganin et al. Domain-Adversarial Training of Neural Networks (Apr. 2016) (Year: 2016).*
Opitz et al. Deep Metric Learning with BIER: Boosting Independent Embeddings Robustly (Jan. 15, 2018) (Year: 2018).*
Abu-El-Haija et al., "Youtube-8m: A large-scale video classification benchmark", Google Research, Sep. 2016.
Cariucci et al., "Autodial: Automatic domain alignment layers", International Conference on Computer Vision (ICCV), 2017.
Carreira et al., "A Short Note about Kinetics-600", Google Research, Aug. 2018.
Carreira, Joao, Zisserman, Andrew. "Quo Vadis, Action Recognition? A New Model and the Kinetics Dataset", IEEE conference on Computer Vision and Pattern Recognition (CVPR), 2017.
De Souza et al., "Procedural generation of videos to train deep action recognition networks", IEEE conference on Computer Vision and Pattern Recognition (CVPR), 2017.
He et al., "Deep Residual Learning for Image Recognition", IEEE conference on Computer Vision and Pattern Recognition (CVPR), 2016.
Heilbron et al., "Activitynet: A large-scale video benchmark for human activity understanding", Universidad del Norte, Colombia, King Abdullah University of Science and Technology (KAUST), Saudi Arabia, 2015.
Karen Simonyan, Andrew Zisserman, "Two-Stream Convolutional Networks for Action Recognition in Videos", Advances in Neural Information Processing Systems (NIPS), 2014.
Karpathy et al., "Large-scale video classification with convolutional neural networks", IEEE conference on Computer Vision and Pattern Recognition (CVPR), 2014.
Kay et al., The Kinetics Human Action Video Dataset, Google Research, 2017.
Kuehne et al., "HMDB: A Large Video Database for Human Motion Recognition", IEEE International Conference on Computer Vision (ICCV), 2011.
Li et al., "Revisiting Batch Normalization for Practical Domain Adaptation", International Conference on Learning Representations Workshop (ICLRW), 2016.
Long et al., "Deep Transfer Learning with Joint Adaptation Networks", International Conference on Machine Learning (ICML), 2017.
Long et al., "Learning Transferable Features with Deep Adaptation Networks", International Conference on Machine Learning (ICML), 2015.
Peng et al., "Syn2real: A New Benchmark for Synthetic-to-Real Visual Domain Adaptation", Boston University, University of Tokyo, University of California Berkeley, 2018.
Soomro et al., "UCF101: A Dataset of 101 Human Actions Classes from Videos in the Wild", Center for Research in Computer Vision, University of Central Florida, Nov. 2012.
Wang et al., "Temporal Segment Networks: Towards Good Practices for Deep Action Recognition", European Conference on Computer Vision (ECCV), pp. 20-36. Springer, 2016.
Yaroslav Ganin, Victor Lempitsky, "Unsupervised Domain Adaptation by Backpropagation", International Conference on Machine Learning (ICML), 2015.
Ganin et al., "Unsupervised Domain Adaptation by Backpropagation", Feb. 27, 2015, retrieved from https://arxiv.org/pdf/1409.7495.pdf>.
International Search Report and Written Opinion, dated Nov. 29, 2019 in the counterpart PCT application PCT/US19/48397.
Bousmalis et al., "Unsupervised Pixel-Level Domain Adaptation with Generative Adversarial Networks", Google Brain and Google Research, Aug. 23, 2017.
Chen et al., "Systems and Methods for Domain Adaptation in Neural Networks Using Cross-Domain Batch Normalization", related U.S. Appl. No. 16/176,949,, Non-Final Office Action dated May 18, 2022.
Gretton et al., "A Kernel Method for the Two-Sample Problem", Journal of Machine Learning Research, May 15, 2008.
Wu et al., "Cross-View Action Recognition over Heterogeneous Feature Spaces", IEEE International Conference on Computer Vision, 2013.
Simoyan et al., "Two-Stream Convolutional Networks for Action Recognition in Videos", Visual Geometry Group, University of Oxford, Nov. 12, 2014.
Tsai et al., "Learning Cross-Domain Landmarks for Heterogeneous Domain Adaptation", CVPR, (2016).
"MSR Datasets page", 2014.
Chen et al.,"Systems and Methods for Domain Adaptation in Neural Networks ", related U.S. Appl. No. 16/176,775, Non-Final Office Action dated Apr. 4, 2022.
Deng et al., "Sparse Autoencoder-based Feature Transfer Learning for Speech Emotion Recognition", 2013, Machine Intelligence & Signal Processing Group, MMK Technnische Universtitat, Munich, Germany.
Xu et al., "A Unified Framework for Metric Transfer Learning", IEEE Transactions on Knowledge and Data Engineering, vol. 29, No. 6, Jun. 2017.
Jamal et al., "Deep Domain Adaptation in Action Space", 2018, Centre for AI & Robotics, Bangalore, India.
Rozantsev et al., "Beyond Sharing Weights for Deep Domain Adaptation", IEEE Transactions on Pattern Analysis and Machine Intelligence, vol. 41, No. 4, Apr. 2019.
Chen et al., " Systems and Methods for Domain Adaptation in Neural Networks ", related U.S. Appl. No. 16/176,775, Applicant's response to Non-Final Office Action filed Jun. 30, 2022.
Chen et al.," Systems and Methods for Domain Adaptation in Neural Networks ", related U.S. Appl. No. 16/176,775, Final Office Action dated Sep. 15, 2022.
Qquab et al., "Learning and Transferring Mid-level Image Representations Using Convolutional Neural Networks", 2014 IEEE Conference on Computer Vision and Pattern Recognition, Jun. 23, 2014.
Qi et al., "A Unified Framework for Multimodal Domain Adaptation", Multimedia, ACM, Oct. 15, 2018, pp. 129-437.

\* cited by examiner

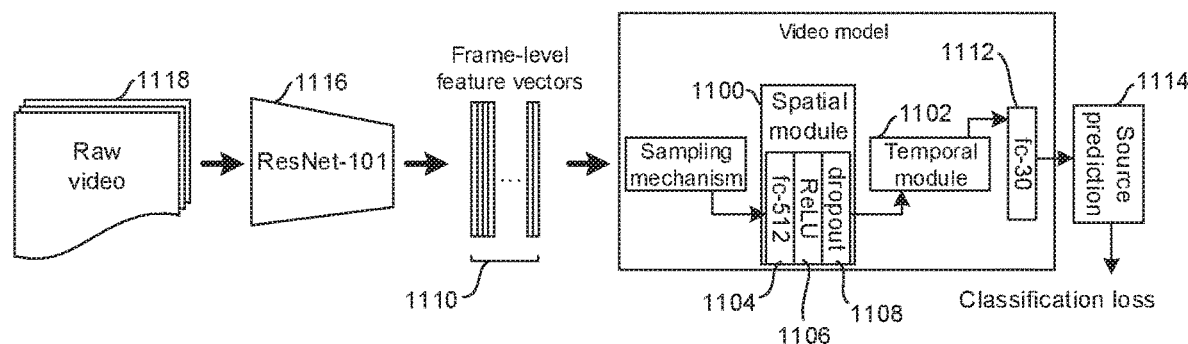
FIG. 11
| Experiment Setting | Accuracy (%) |
|---|---|
| Oracle | 66.3 |
| Source only | 16.0 |
| Discrepancy-based DA | 19.6 |
| Adversarial-based DA | 21.6 |
| Normalization-based DA | 25.2 |
FIG. 12
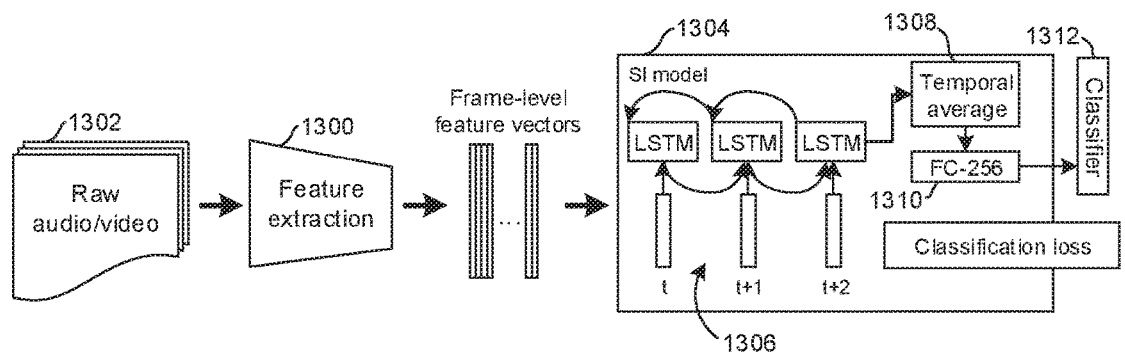
FIG. 13

| | 5 utts | 10 utts | 20 utts | 50 utts | 100 utts | 150 utts |
|---|---|---|---|---|---|---|
| SI_A | 45.8 | | | | | |
| SI_V | 28.1 | | | | | |
| SI_AV | 46.8 | | | | | |
| SD_A | 47.0 | 47.7 | 50.1 | 52.6 | 56.4 | 57.9 |
| SD_V | 30.8 | 35.1 | 40.6 | 48.7 | 58.8 | 60.1 |
| SD_AV | 49.4 | 49.5 | 54.0 | 58.2 | 63.6 | 65.9 |

SYSTEMS AND METHODS FOR DOMAIN ADAPTATION IN NEURAL NETWORKS USING DOMAIN CLASSIFIER

FIELD

The application relates generally to technically inventive, non-routine solutions that are necessarily rooted in computer technology and that produce concrete technical improvements.

BACKGROUND

Machine learning, sometimes referred to as deep learning, can be used for a variety of useful applications related to data understanding, detection, and/or classification including image classification, optical character recognition (OCR), object recognition, action recognition, speech recognition, and emotion recognition. As understood herein, however, machine learning systems can be inadequate to recognize, e.g., action in one domain, such as computer games, using a training set of data from another domain, e.g., motion picture video.

For example, in computer gaming industries, video and audio are two separate processes. Games are first designed and produced without audio, and then audio groups investigate the whole game videos and insert the corresponding sound effects (SFX) from the SFX database, which is time-consuming. As understood herein, machine learning may be used to accelerate the process, but current action recognition models are trained on real world video data sets, making them subject to dataset shift or dataset bias when used on game video.

SUMMARY

To overcome the above-mentioned domain mismatch problem, at least two generic domains of training data (image or video or audio) are used to classify a target data set. A pair of training data domains may be established by, for instance, real world video and computer game video, first and second speaker voices (for voice recognition), standard font text and cursive script (for handwriting recognition), etc.

Thus, a generic domain adaptation module established by a loss function and/or an actual neural network receives input from multiple output points from two training domains of deep learning and provides an output measure so that optimization can be done for one and possibly both of the two tracks of neural networks. A generic cross-domain feature normalization module may also be used and is inserted into any layer of the neural network.

Accordingly, in one aspect an apparatus includes at least one processor and at least one computer storage that is not a transitory signal and that includes instructions executable by the at least one processor. The instructions are executable to access a first neural network associated with a first data type, access a second neural network associated with a second data type different from the first data type, and provide as input first training data to the second neural network. The instructions are also executable to select a first layer, with the first layer being a hidden layer of the second neural network. The instructions are then executable to identify an output from the first layer that was generated based on the first training data and, using a third neural network, determine whether the output from the first layer is from the first neural network. The third neural network is different from the first and second neural networks. The instructions are further executable to, based on a determination that the output from the first layer is not from the first neural network, adjust one or more weights of the first layer.

In some examples, the instructions may be executable to initially establish the second neural network by a copying of the first neural network.

Also in some examples, the instructions may be executable to, based on a determination that the output from the first layer is from the first neural network, decline to adjust one or more weights of the first layer. In some embodiments, the output may be a first output, and the instructions may be executable to, based on a determination that the first output from the first layer is from the first neural network, select a second layer, with the second layer also being a hidden layer of the second neural network. The instructions may also be executable to identify a second output, with the second output being from the second layer and, using the third neural network, determine whether the second output is from the first neural network. The instructions may then be executable to, based on a determination that the second output is not from the first neural network, adjust one or more weights of the second layer. The first and second layers of the second neural network may be selected randomly.

Additionally, prior to using the third neural network to determine whether the output from the first layer is from the first neural network, the instructions may be executable to adjust one or more weights of one or more layers of the third neural network so that the third neural network learns to correctly classify outputs from layers of either of the first neural network and the second neural network. The third neural network may even operate in unsupervised mode to, using labeled data, learn to correctly classify outputs from layers of either of the first neural network and the second neural network.

In another aspect, a method includes accessing a first neural network associated with a first data type, accessing a second neural network associated with a second data type different from the first data type, and providing, as input, first training data to the second neural network. The method also includes selecting a first layer, with the first layer being a hidden layer of the second neural network, identifying an output from the first layer that was generated based on the first training data, and, using a third neural network, determining whether the output from the first layer is from the first neural network. The third neural network is different from the first and second neural networks. The method also includes, based on determining that the output from the first layer is not from the first neural network, adjusting one or more weights of the first layer.

In still another aspect, an apparatus includes at least one computer storage that is not a transitory signal and that includes instructions executable by at least one processor to access a first domain associated with a first domain genre, access a second domain associated with a second domain genre different from the first domain genre, and, using training data provided to the first and second domains, classify a target data set. The instructions are also executable to output a classification of the target data set, where the target data set is classified by a domain adaptation module that includes a domain classifier to inverse a gradient and back-propagate the gradient to a main model.

The details of the present application, both as to its structure and operation, can best be understood in reference to the accompanying drawings, in which like reference numerals refer to like parts, and in which:

BRIEF DESCRIPTION OF THE DRAWINGS

FIGS. 4, 6, 8, 11, 13, 15, and 18 show examples of various domain adaptation architectures in accordance with present principles; and FIGS. 12 and 17 are example tables illustrating present principles.

DETAILED DESCRIPTION

Figure 1:
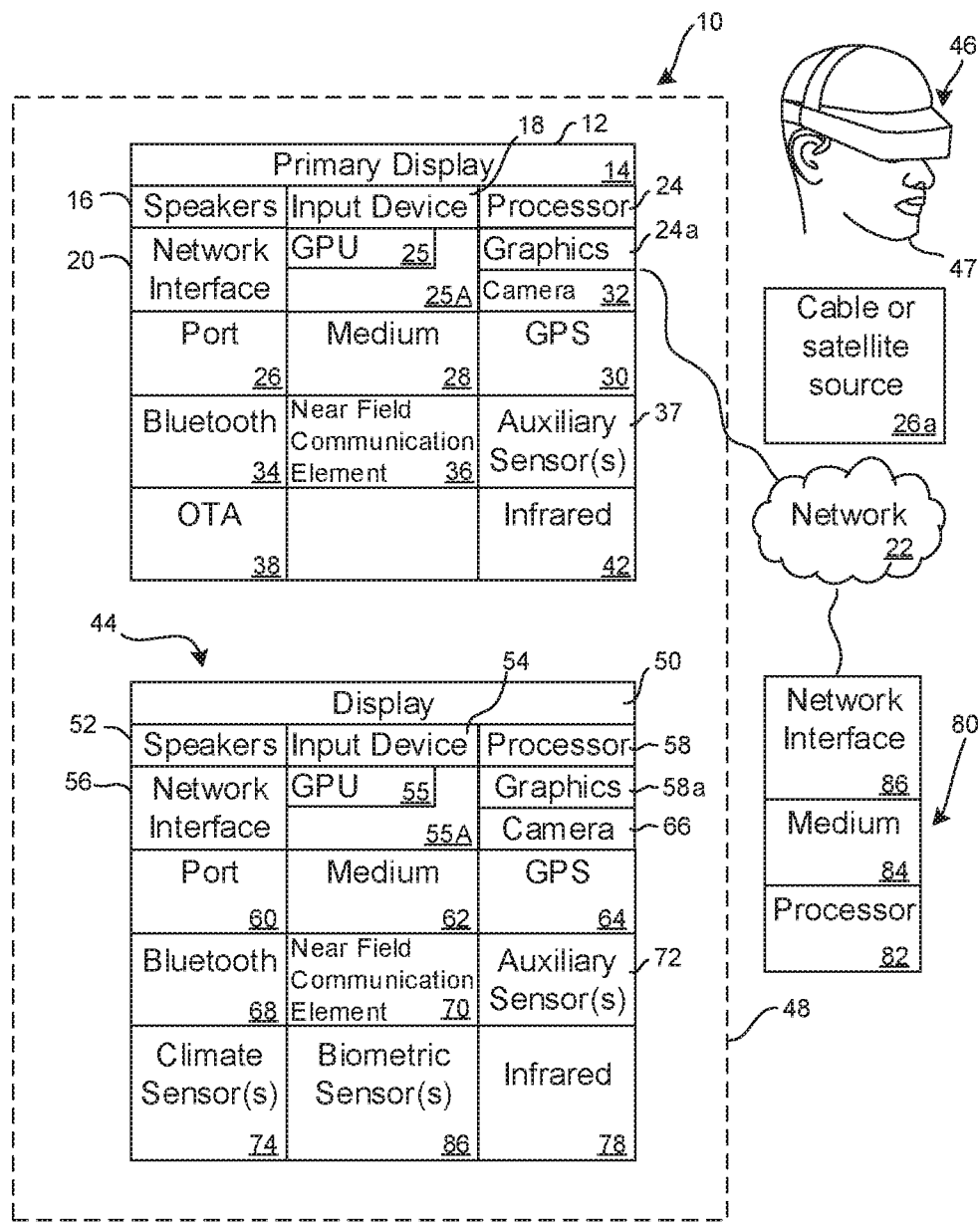
FIG. 1 is a block diagram of an example system consistent with present principles.

In accordance with present principles, deep learning based domain adaptation methods may be used to overcome the domain mismatch problem for image or video or audio related tasks such as understanding/detection/classification given any source and target domain data. At least three generic types of data may be used (image or video or audio) and all types of neural network modules may be used to improve the system performance.

As described herein, two tracks of deep learning processing flow may be used for any of the specific input to output tasks. One track may be for one domain of data and another track may be for another domain of data so that there may be at least two tracks of deep learning for two domains of data. Pairs of domains could be, as examples, two types of video like real world video and video game world video, one speaker's voice and another speaker's voice, standard font text and cursive scripts, speech recognition domains, text to speech, and speech to text.

A generic domain adaptation module will be described below, with it sometimes using loss functions. The generic domain adaptation module may also use an actual neural network connection that takes input from multiple output points from two tracks of deep learning and provides an output measure so that optimization can be done for the two tracks of neural networks. The generic domain adaptation module may also use a generic cross-domain feature normalization module that can be inserted into any layer of a neural network.

Thus, the methods described herein may concern multiple objects and multiple actions associated with the multiple objects. E.g., an image text-block of many texts may be an "object", and the type of the image block may be an "action".

This disclosure also relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles.

In the example shown, all three devices 12, 44, 46 are assumed to be members of a network such as a secured or encrypted network, an entertainment network or Wi-Fi in, e.g., a home, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., domain adaptation as disclosed herein. Additionally or alternatively, the server 80 may be implemented by one or more game consoles or other computers in the same room as the other devices shown in FIG. 1 or nearby.

Before describing additional figures, it is to be understood in accordance with present principles that for optimizing artificial intelligence systems, an optimized source domain/model of well-trained data may be copied to establish a target domain/model that is to be further refined for a different type of data than the source domain. For instance, the source domain may be for action recognition in real-world video, whereas the target domain may be for action recognition in video game video. Owing to the different video types and visuals, the source domain may be inadequate for performing action recognition using video game data, but may still provide a good starting point for adapting an adequate target domain for action recognition from video game data.

Thus, present principles describe systems and methods for performing domain adaptation and optimization. According to the present disclosure, this may be performed not just by back propagating from the output/activation layer of the neural network once an error has been identified by a human supervisor or system administrator, but by running different but related training data through both the target domain and source domain and selecting any given hidden or intermediate layer for each domain that are parallel to each other to determine whether the outputs are similar or even the same. If the outputs are not similar statistically, as might be defined by a supervisor or administration, certain weight adjustments for the intermediate target layer can be performed as described herein to minimize the difference in outputs from the parallel layers (e.g., to ensure that the abstraction for the parallel layers are similar/the same) and thereby further optimize the target domain for the different type of data. Then, after training, testing may also be done to ensure that optimization has been performed to an acceptable degree.

As far as the different but related training data goes, the data may be different in that it is data suitable for the given domain, but related in that the training data for each of the domains may pertain to a similar concept or metaphor. For instance, the training data fed into the source domain may be a real-world video of a human being performing a punch, while the training data fed into the target domain may be a video game video of a game character performing a punch. As another example, this time in relation to object recognition, the training data fed into the source domain may be a real-world picture of an apple, while the training data fed into the target domain may be a video game video of a digital apple.

Additionally, parallel as used above in reference the source and target intermediate/hidden layers refers to respective source and target intermediate layers that begin the same owing to the source domain being copied to initially establish the target domain, with those layers performing the same task(s) and/or having the same purpose. Thus, intermediate source layer number five hundred, for instance, may be parallel to intermediate target layer number five hundred, where the target domain was copied from the source domain, the two domains have the same number of intermediate layers, and target layer number five hundred was initially established by source layer number five hundred.

With the foregoing in mind, present principles will now be described in more detail. Beginning in reference to the logic of FIG. 2 as illustrated in flow chart form as an example of modifications of a generic track of a neural network (NN) for video classification, the baseline architecture for video classification may be modified as follows. Beginning at block 200, modification of a common convolutional neural network (CNN) to a spatial region extraction network (SREN) may be performed so that feature vectors of a whole scene of video and important spatial regions (e.g., objects, body parts, etc.) can be extracted. The logic of FIG. 2 may then proceed to block 202 where two types of outputs, region features and scene features, may be concatenated into frame-level feature vectors, and then at block 204 they may be input into the video model.

Figure 2:
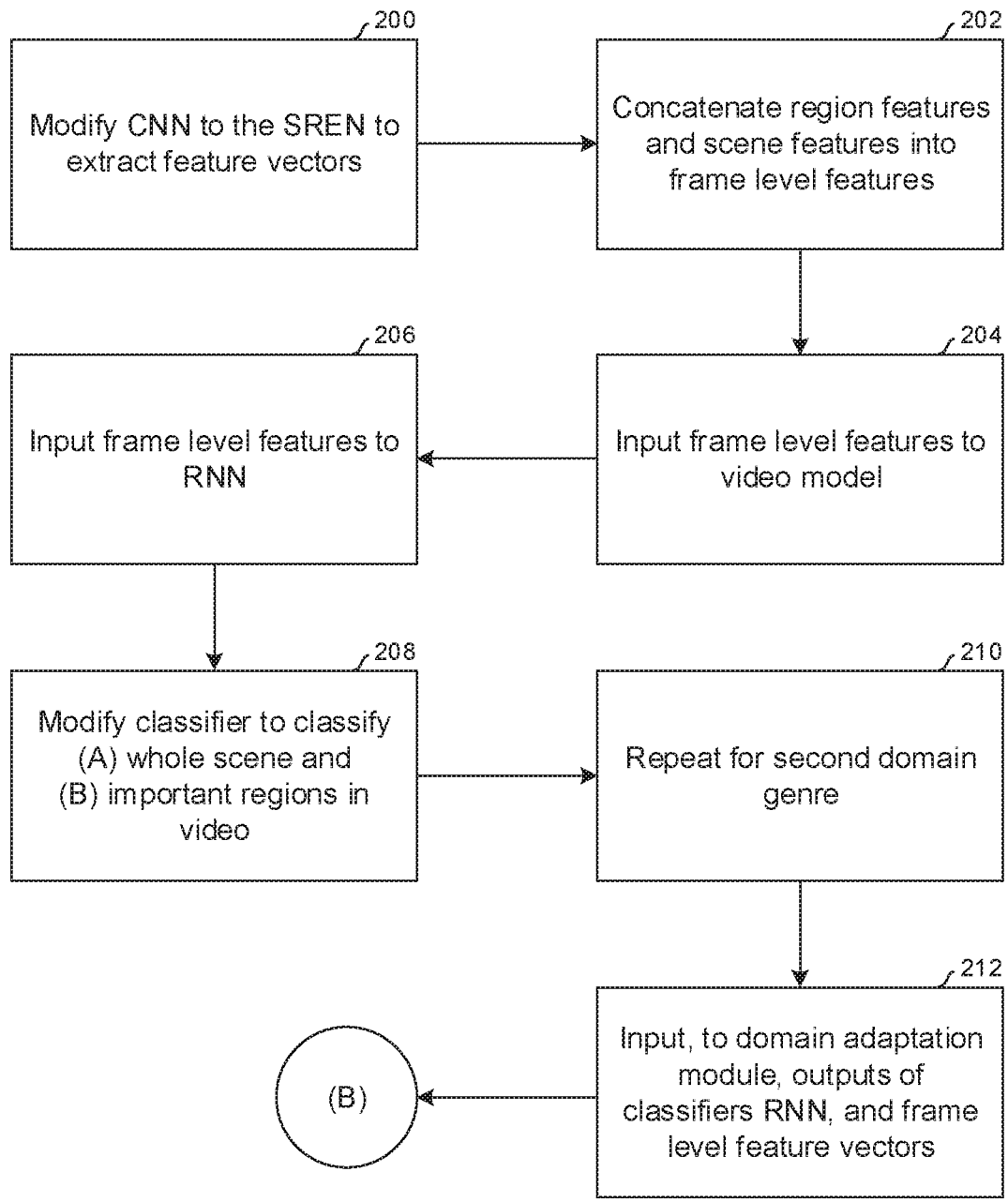
FIGS. 2, 3, 5, 7, 9, 10, 14, and 16 are flow charts of example logic consistent with present principles.

The logic of FIG. 2 may then proceed to block 206 where the frame-level feature vectors may be input into a recurrent neural network (RNN) including long short-term memory (LSTM) units to model temporal dynamic information. The logic may then proceed to block 208 where the final classifier may be modified to classify both (A) the whole scene and (B) all important regions in the video(s).

Figure 7:
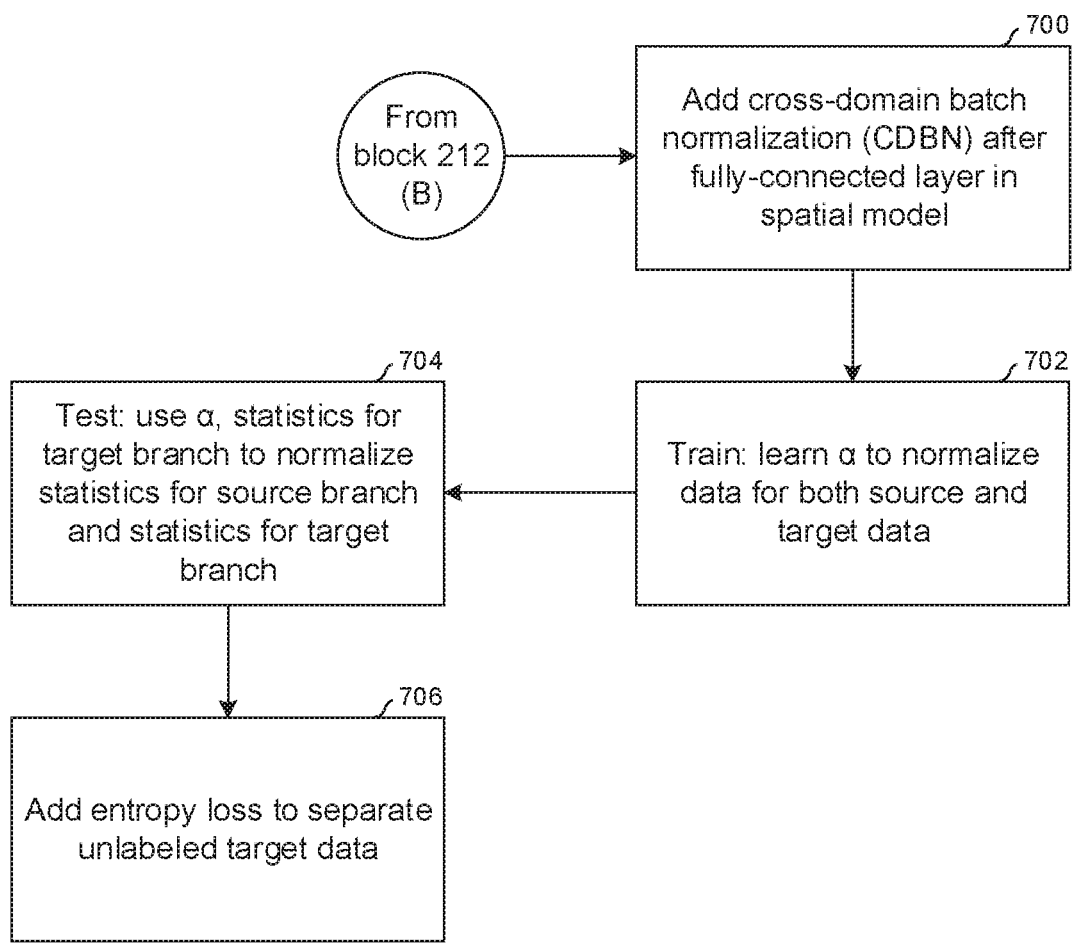

The logic of FIG. 2 may then proceed to block 210 where blocks 200-208 may be repeated for a second domain genre to utilize and optimize the whole architecture with data from different video types/genres. Then at block 212 the frame-level feature vectors, features after RNN and the classifier outputs may be input into a domain adaptation module as inputs. The domain adaptation module may use one or more of the following three methods, each of which is shown in a different flow chart in FIGS. 3, 5, and 7, respectively, and described in reference to video data: a discrepancy function method (FIG. 3), a domain classifier method (FIG. 5), and a cross-domain batch normalization method (FIG. 7).

Figure 3:
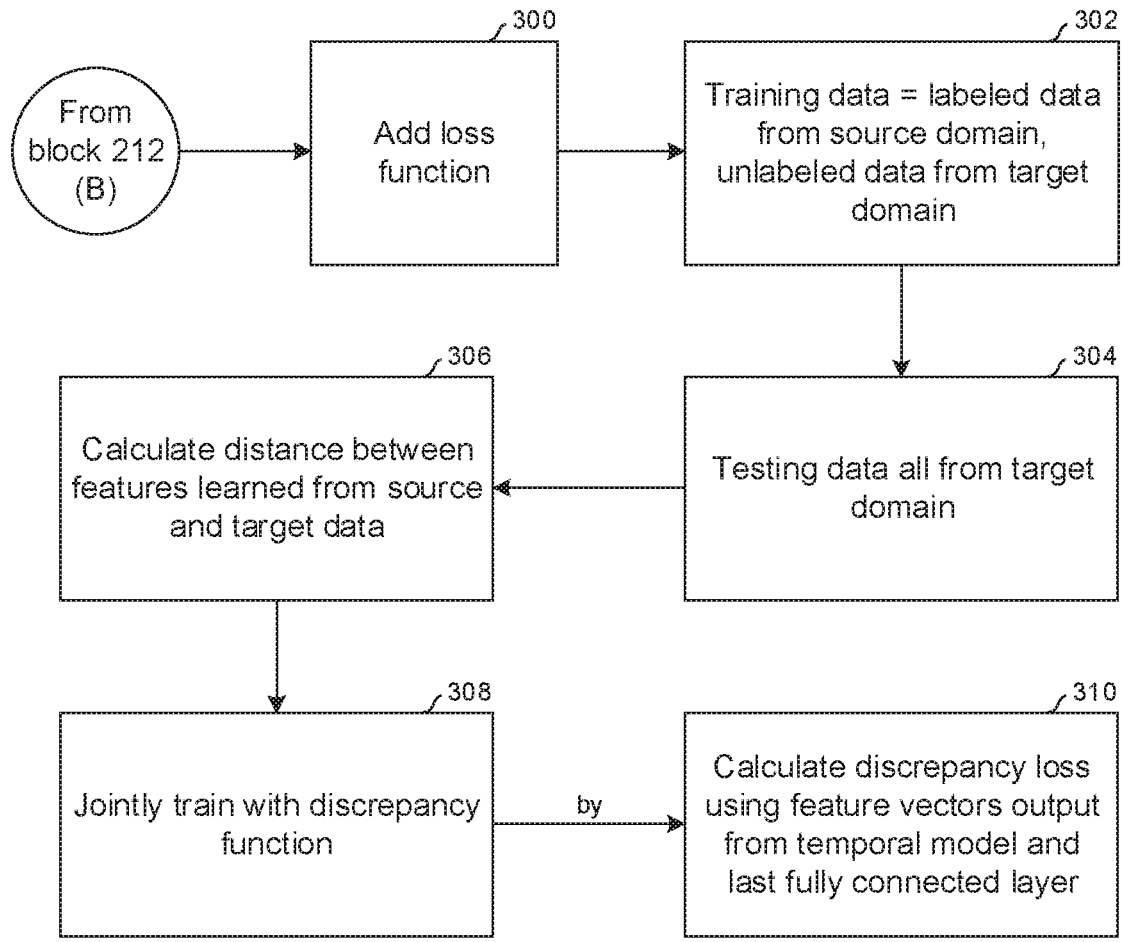

Beginning with the discrepancy function method in reference to FIG. 3, it is to be understood that a discrepancy function may be used to calculate the distance of the overall data distribution between source and target data. The discrepancy loss can be defined by different metrics from any subset of layers of the source/target models, such as probability based distance between the source and target data extracted from multiple layers of the models (as will be described further below in reference), or by regularizing the parameter difference between the source and target models (as will also be described further below), or a weighted sum of these two types of loss (as will also be described further below). By jointly training with the discrepancy function, the model will be optimized to reduce the distribution difference to increase the generalization capability.

Accordingly, from block 212 as described above, FIG. 3 may begin at block 300 where another loss function (different from an overall loss function used when back-propagating from an output layer) may be defined and added, with this additional loss function being a discrepancy loss function that is calculated as the distance between the features learned from source and target data output from respective parallel layers.

Without the discrepancy loss, the overall loss function may be computed only using labeled source data, so during the optimization, the model will gradually fit the source data, which will increase the distribution difference between two domains. Thus, an unsupervised domain adaptation protocol may be used to reduce the difference of overall distribution between source and target data, where training data is used that includes labeled data from the source domain and unlabeled data from the target domain (generally designated block 302) and where testing data is used that is all from the target domain (generally designated block 304).

At block 306 of FIG. 3 the logic calculates, possibly without a label, the distance between the features learned from source and target data output from respective parallel layers. Then at block 308 joint training with the discrepancy loss function may be used for the model to reduce the difference of overall distribution between source and target data. This may be done at block 310 by calculating the discrepancy loss using the feature vectors from the output of the temporal module and the last fully-connected layer. Example action recognition architecture incorporating these principles from FIG. 3 and its description are shown in FIG. 4.

Figure 4:
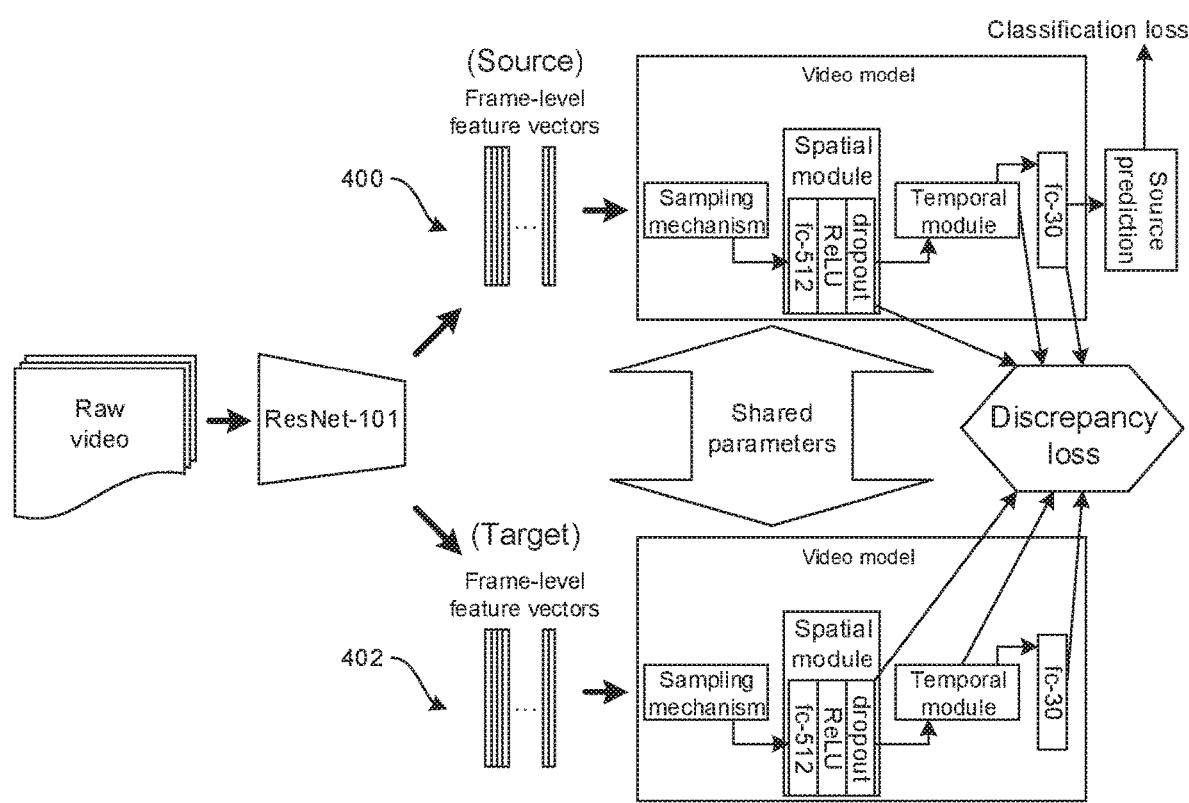

Thus, as shown in FIG. 4 a device undertaking present principles may access a first neural network/domain 400 associated with a first data type that may be a source neural network/domain, access a second neural network/domain 402 associated with a second data type different from the first data type that may be a target neural network/domain, and provide, as input, first training data to the first neural network. The device may also provide, as input, second training data to the second neural network, where the first training data is different from the second training data but still related.

For example, the first neural network/domain 400 may pertain to object recognition using real-world video, while the second neural network/domain 402 may pertain to object recognition using video game video. Thus, the first training data may be video of a real-world apple from a real-life video recording, and the second training data may be video of a video game-rendered graphical apple from a video game.

The device may then identify a first output from a first layer, with the first layer being an output/activation layer of the first neural network and with the first output being based on the first training data. The device may also identify a second output from a second layer, with the second layer being an output/activation layer of the second neural network and with the second output being based on the second training data. The device may then, based on the first and second outputs, determine a first adjustment to one or more weights of a third layer, with the third layer being an intermediate layer of the second neural network. The first adjustment may be determined, for example, via back-propagation from the second layer of the second neural network (the output/activation layer of the second neural network) using a first discrepancy/loss function.

Thereafter, a human supervisor may provide a command to manually select, or the device itself may select (e.g., randomly), the third layer and a fourth layer (with the fourth layer being an intermediate layer of the first neural network). The third and fourth layers may be parallel intermediate/hidden layers. Thereafter, a third output from the third layer may be measured and compared to a fourth output from the fourth layer using a second discrepancy/loss function tailored (e.g., by a human supervisor) to measuring the similarities between the third and fourth outputs regardless of whether an object label (e.g., "apple") for the second neural network is available. The third and fourth outputs themselves may be respective vector outputs of the respective third and fourth layers prior to the third and fourth outputs being respectively provided to subsequent respective intermediate layers of the respective second and first neural networks, with the third and fourth outputs themselves being respectively based on the second and first training data.

The device may then, based on the comparison/second function, determine a second adjustment to the one or more weights of the third layer, with the amount of weight changes being proportional to the magnitude of the second function. Thereafter the device may subsequently adjust the one or more weights of the third layer (and even one or all preceding layers of the second neural network) based on consideration of both the first adjustment and the second adjustment. For instance, the one or more weights of the third layer may be adjusted by adding together respective weight changes from the first adjustment and from the second adjustment. However, in some examples, only weight changes from one of the first adjustment or the second adjustment may be applied if determined by the human supervisor or device to result in less loss than the sum of the weight changes from both the first adjustment and the second adjustment. In still other examples, half of the weight change(s) from the first adjustment and half of the weight change(s) from the second adjustment may be added together if determined by the human supervisor or device to result in less loss than the alternatives above.

Additionally, note that the second neural network may be established by a copy of the first neural network prior to the second training data being provided to the second neural network. The third and fourth layers of the respective neural networks may be layers other than output layers, such as intermediate hidden layers of the respective neural networks.

Additionally, the first training data may be related to the second training data, such as both of them pertaining to a same type of action during action recognition or a same type of object during object recognition.

Figure 5:
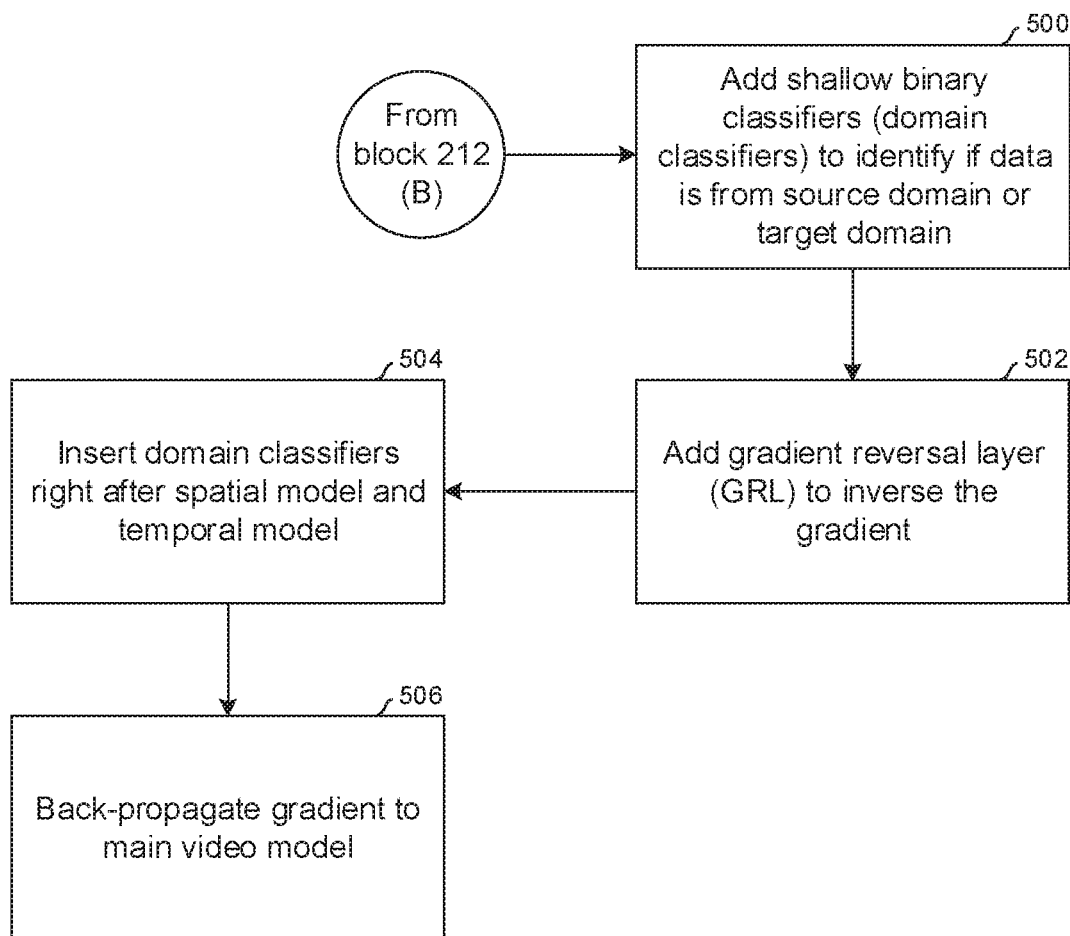

The domain classifier method referenced above will now be described in reference to FIG. 5 to describe example adversarial-based domain adaptation. This method may use a gradient reversal layer (GRL) in a domain classifier to adjust weights and hence confuse the whole architecture/domain classifier so that the domain classifier will gradually lose the capability to differentiate outputs from different domains. The domain classifier may itself be established at least in part by a third neural network separate from the source and target neural networks.

Figure 6:
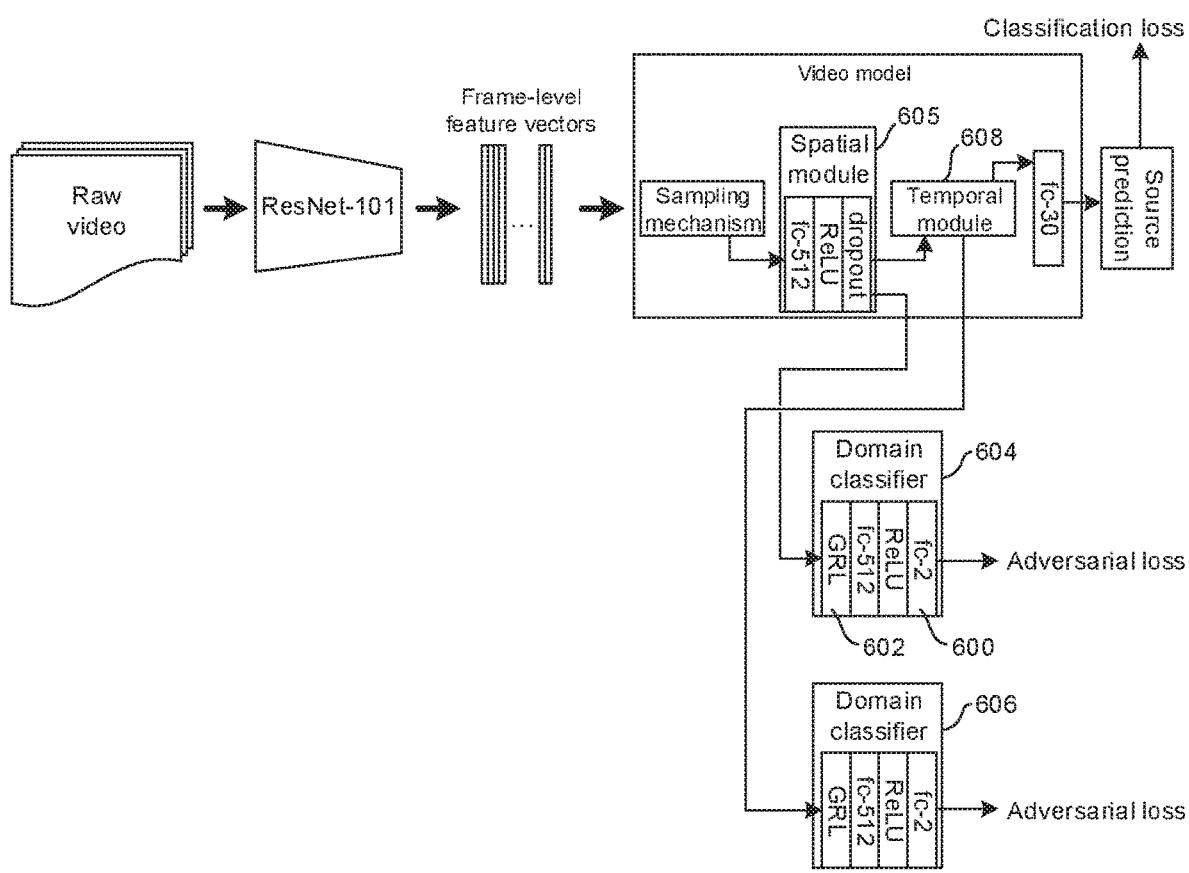

With the foregoing in mind, from block 212 as described above, the logic of 5 may begin at block 500 by adding additional shallow binary classifiers (referred to as "domain classifiers") to identify or discriminate whether the data input to the domain adaptation module at block 212 is from the source or target domain via block FC-2 600 as shown in FIG. 6. Further, before the device back-propagates the gradient to the main model (e.g., main video model), at block 502 a gradient reversal layer (GRL) 602 may be used by one or more domain classifiers 604 to inverse the gradient so that the video model may be optimized into the opposite direction and thus the domain classifier(s) will gradually lose the capability to differentiate vectors from the two domains. Thus, the model will be generalized to both source and target domains.

Then at block 504 one domain classifier 604 may be inserted right after the spatial module 605 of the architecture and another domain classifier 606 may be inserted right after the temporal module 608 of the architecture in order to perform domain adaptation in both spatial and temporal directions. Then at block 506 the device may back-propagate the gradient to the main model (which in this case may be a video model). Example architecture itself for this embodiment is shown in FIG. 6.

Thus, a device undertaking present principles may access a first neural network/domain associated with a first data type and that may be a source neural network/domain. The device may also access a second neural network/domain associated with a second data type different from the first data type and that may be a target neural network/domain. The device may then provide, as input, first training data to the second neural network.

For example, the first neural network/domain may pertain to action recognition using real-world video while the second neural network/domain may pertain to action recognition using video game video. Thus, the first training data may be one frame of a video game-rendered graphical punching action from a video game.

Thereafter, a human supervisor may provide a command to manually select, or the device itself may select (e.g., randomly), a first intermediate/hidden layer of the second neural network, and then identify a first vector output from the first layer of the second neural network for the respective frame of video. Then, using a third neural network that may be a domain classifier, the device may determine whether the first vector output is from the first neural network or the second neural network.

If the third neural network determines that the first vector output is from the second neural network (e.g., the video game video domain), the third neural network is not confused and hence one or more weights of the first layer of the second neural network may be adjusted to subsequently confuse the third neural network when it runs again, making the third neural network classify a second vector output from the first layer of the second neural network as actually being a vector output from the first neural network rather than a vector output from the second neural network. But if that second vector output is still classified as being a vector output from the second neural network, the weights of the first layer that were adjusted may be reverted back to their previous values and another layer of the second neural network may be selected instead and the process may be repeated.

However, if instead of the paragraph immediately above the third neural network classifies the first vector output from the first layer of the second neural network as actually being an output from the first neural network (e.g., the real-world video domain), the device may decline to adjust one or more weights of the first layer of the second neural network since the first layer of the second neural network is already at least somewhat optimized (e.g., optimized enough to confuse the third neural network into thinking the first vector output from the second neural network was actually from the first neural network). If desired, another hidden layer may then be selected and this process may be repeated for the other hidden layer of the second neural network.

Thus, using the example of action recognition, if game data output is classified by the domain classifier/third neural network as being from the game domain, weights of the hidden layer of the game domain may be adjusted using a "reverse" loss function via the gradient reversal layer of the domain classifier/third neural network to reach the goal of having the domain classifier/third neural network classify subsequent game data outputs as being from the real-life video domain.

It should also be noted that the foregoing as it pertains to the domain classifier method may be performed after the third neural network itself (the domain classifier) has been initially trained and optimized for accuracy. During this initial phase of training the third neural network, the third neural network may self-correct, unsupervised, when it incorrectly classifies a vector output of labeled data as being from one domain when in fact it was from the other domain per the label.

Thus, the weights for the third neural network may be random at first, and then during self-correcting, back-propagation from the output layer of third neural network may be done to adjust the weights of the third neural network and hence optimize the third neural network itself (that will establish the domain classifier) to correctly classify outputs from hidden layers or the output layers as being from one domain or the other.

The cross-domain batch normalization (CDBN) method referenced above will now be described in reference to FIG. 7 to illuminate another version of domain adaptation in accordance with present principles, again referencing video data as an example. The present application recognizes that batch normalization (BN) itself, originally used to improve optimization, can also be modified to benefit domain adaptation. To do so, the CDBN method may apply a CBDN module 800 (FIG. 8) to both the spatial region extraction network (SREN) 802 and the video model 804. With CDBN, a mechanism may adaptively select the domain statistics to normalize the inputs, which can decrease the distribution difference between different video types. Thus, one of the differences of this MIN from normal BN is that CDBN calculates two statistics: One is for the source branch and the other one is for the target branch. Both statistics are calculated using the mixture of source and target data with the ratio α (alpha), as shown according to the example architecture of FIG. 8 for this embodiment.

Figure 8:
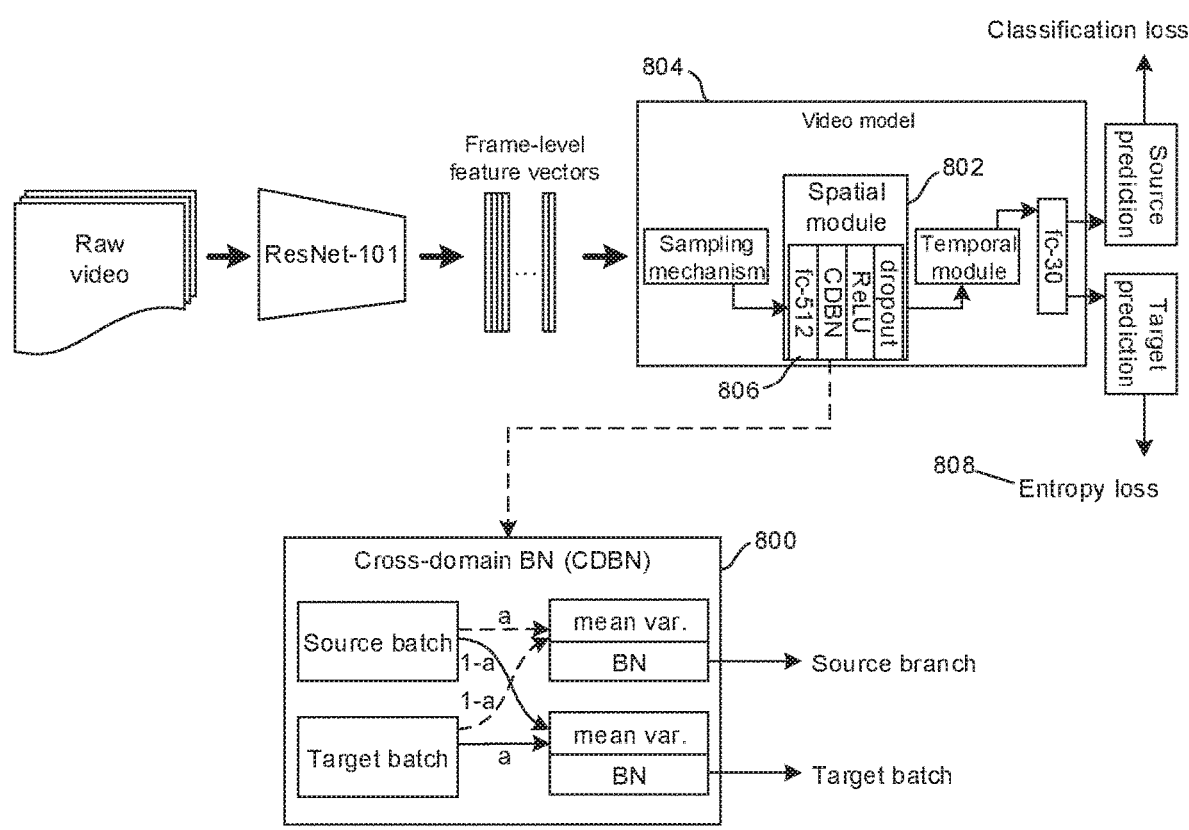

Now describing the example logic of FIG. 7 for the CDBN method, from block 212 as described above, the logic may begin at block 700 by adding CDBN after the fully-connected layer 806 in the spatial module as shown in FIG. 8. Then, during training at block 702, the model may learn the best ratio α (alpha) to normalize the data for both source and target branches. Then during testing at block 704, α (alpha) and the statistics for the target branch may be used to normalize the statistics for the source branch and the statistics for the target branch. Then at block 706 entropy loss 808 may be added to separate unlabeled target data.

Thus, a device undertaking present principles may access a first neural network associated with a first data type, access a second neural network associated with a second data type, and provide, as input, first training data to the first neural network. The device may also provide, as input, second, different training data to the second neural network. The device may then identify a first output from an intermediate layer of the first neural network based on the first training data and identify a second output from a parallel intermediate layer of the second neural network based on the second training data. The device may then identify a ratio to normalize the first output and the second output and apply an equation that accounts for the ratio to change one or more weights of the intermediate layer of the second neural network.

The ratio may pertain to a mean value, and in some examples mean and variance between the first output and the second output may both be analyzed to apply the equation. The ratio may be identified and the equation may be applied using cross-domain batch normalization (CDBN) to have similar means and variances between the outputs from the parallel intermediate layers.

As with the other methods, the second neural network for the CDBN method may be established by a copy of the first neural network prior to the second training data being provided to the second neural network. Further, in some examples the first and second neural networks may pertain to action recognition and the first training data may be related to the second training data in that the first and second training data may both pertain to a same action. In other examples, the first and second neural networks may pertain to object recognition and the first training data may be related to the second training data in that the first and second training data may both pertain to a same object.

Based on the foregoing descriptions in reference to FIGS. 2-8, it may now be appreciated that the proposed framework(s) are both generic and flexible. Many speaker/user adaptation algorithms can be applied to this framework, with slight modifications to one or more of the domain loss or part of the source/target models. For example, in speaker adaptation, the adversarial loss can be defined as the speaker classification error so that the deep features learned by the source model will become both discriminative with respect to acoustic units (e.g., such as phonemes or words) and invariant to speakers.

Applications and examples incorporating present principles will now be described.

Present principles may be used in all possible deep learning-based methods for image, video and audio data processing, among others.

For gaming object and/or action detection, gaming videos may be collected and an efficient data preparation tool may be developed to convert raw videos into a processed dataset following the protocol with another existing video dataset. That can be combined with the real-world video dataset "Kinetics" to form a first action recognition dataset for domain adaptation. Present principles can be used to recognize multiple objects and actions in both real and gaming worlds, and can also be used to evaluate the dataset and enhance the dataset generation.

For optical character recognition, present principles may be used to recognize different hand-writing styles, including the standard font, artistic text, the fonts in games, etc.

For voice conversion, present principles may be used to convert one speaker's voice to other speaker's voice.

For speaker adaptation for speech recognition, present principles may be used for audio-related tasks by replacing the inputs with a speech spectrogram. In speaker adaptation, the source model may be pre-trained using many speakers' voices, and the target domain may contain only a few utterances from a new speaker. In this case, the target domain model can be initialized by the source model. During adaptation, joint optimization can be performed for the classification loss of the target domain data and the discrepancy loss between the source and target models. The discrepancy loss can either be the parameter difference between the source and target models, or the phone distribution distance between the source and target model outputs.

For multimodal user adaptation for emotion recognition (e.g., input as text, image, video, and voice with emotion output), given a user's voice or video clips (or both), the domain adaptation module can adapt one user's style to another one, so the user adaptation can improve emotion recognition accuracy for new speakers not in the training set. In addition, the spatial region extraction network can be used to detect multiple facial expressions, so emotion can be recognized from multiple people with different styles.

Domain adaptation for action recognition between gaming and real worlds will now be discussed in further detail, with example architectures to be used in accordance with this type of domain adaptation already being shown in FIGS. 4, 6, and 8.

In gaming industries, video and audio may be two separate processes. Games are often initially designed and produced without audio, and then audio groups investigate the whole game videos and insert the corresponding sound effects (SFX) from the game's SFX database. Algorithms can be developed in accordance with present principles to let machines automatically analyze visual contents from gaming videos and then match the corresponding SFX with the analysis results to optimize the process.

Deep learning techniques may also be used to analyze gaming video contents. Action recognition is an important task for SFX-matching since most of the important sound effects are related to the characters' actions. For action recognition using deep learning approaches, those approaches may be applied to recognize actions in games and automatically identify and locate corresponding action-related SFX to accelerate the game production process.

Unfortunately, most if not all existing action recognition systems are for real-world videos, which means they all show the performance on real-world datasets. Those trained models cannot be directly used for gaming videos since there is huge distribution discrepancy, which is also called dataset shift or dataset bias. Thus, by using present principles a model can be trained using the data collected from gaming videos, using domain adaptation to diminish the effects from dataset shift for video tasks, including for deep architecture for action recognition.

Below a model will be described to learn the domain relation between gaming and real-world videos, with reference being made to the logic shown in the flow charts of FIGS. 9 and 10.

Figure 9:
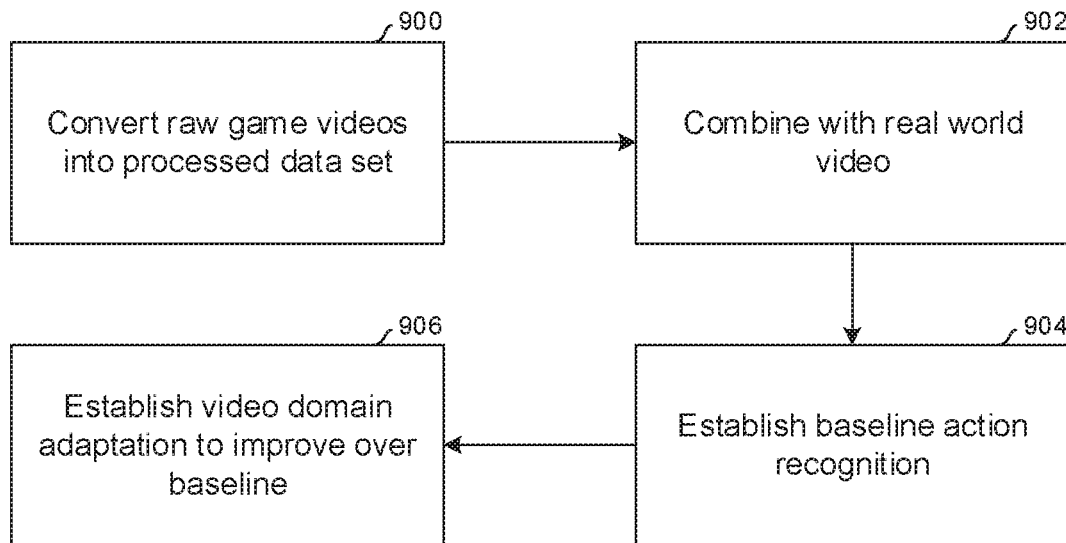

For a real action dataset, gaming videos may be collected and an efficient data preparation tool may be developed to convert raw videos into a processed dataset following the common protocol with another existing video dataset, as reflected in block 900 of FIG. 9. That can then be combined with the real-world video dataset "Kinetics" to form the first action recognition dataset for domain adaptation, as reflected in block 902 of FIG. 9.

Then, per block 904 of FIG. 9, a baseline approach may be provided for action recognition, e.g., without any domain adaptation technique for fair comparison. Then, for video domain adaptation, the first action recognition architecture may be developed that integrates several domain adaptation techniques (e.g., discrepancy-based, adversarial-based, and normalization-based) into the pipeline to improve performance over the baseline, as reflected in block 906 of FIG. 9.

Thus, a baseline architecture for action recognition may be established as shown in FIG. 11. The input raw videos may be feed-forwarded to the 101-layer ResNet to extract frame-level feature vectors. The number of feature vectors may correspond to the number of video frames. The feature vectors may then be uniformly sampled and ted into the model. The whole model may be divided into two parts as shown in FIG. 11—a spatial module 1100 and temporal module 1102. The spatial module may include one fully-connected layer 1104, one rectified linear units (ReLU) 1106, and one dropout layer 1108. The spatial module may convert the general-purposed feature vectors 1110 into the task-driven feature vectors, which may be action recognition. The temporal module 1102 aims to aggregate the frame-level feature vectors to form a single video-level feature vector to represent each video. The average values may be computed for all feature elements along the temporal direction to generate video-level feature vectors. This technique is sometimes referred to as temporal pooling. Then the video-level feature vectors may be fed to the last fully-connected layer 1112 as the classifier to generate the prediction 1114. The prediction may be used to calculate the classification loss and then used to optimize the whole model.

Figure 10:
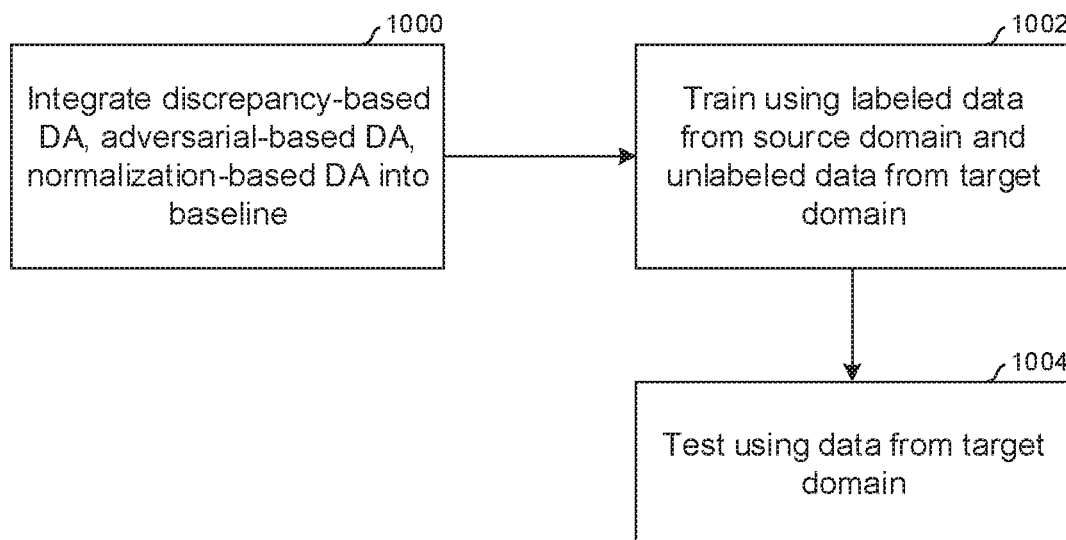

Then, according to block 1000 of FIG. 10, one or more domain adaptation (DA) approaches as described herein may be integrated into the baseline architecture: discrepancy-based domain adaptation, adversarial-based domain adaptation, and normalization-based domain adaptation (as shown in FIGS. 4, 6, and 8, respectively). An unsupervised domain adaptation protocol may then be followed, where the training data includes labeled data from the source domain and unlabeled data from the target domain (according to block 1002 of FIG. 10), while the testing data may be all from the target domain (according to block 1004 of FIG. 10). For further details about domain adaptation methods according to this example for action recognition, refer back to FIGS. 2-8 and the corresponding descriptions thereof.

Then, to evaluate the performance of the various domain adaptation approaches, the dataset may include data in both virtual and real domains. Gaming videos may then be collected from several games to build a gaming action dataset for the virtual domain. The total length of the videos may be, as an example, five hours and forty one minutes. All the raw and untrimmed videos may be segmented into video clips according to annotation. The total length for each video clip may be 10 seconds, and the minimum length may be 1 second. The whole dataset may also be split into training set, validation set and testing set by randomly selecting videos in each category with the ratio 7:2:1. For the real domain, Kinetics-600 may be used.

By following a close-set setting for domain adaptation, thirty overlapped categories may be selected between virtual and real domains. The categories may include, as examples, break, carry, clean floor, climb, crawl, crouch, cry, dance, drink, drive, fall down, fight, hug, jump, kick, light up, news anchor, open door, paint brush, paraglide, pour, push, read, run, shoot gun, stare, talk, throw, walk, wash dishes. Each category may correspond to multiple categories in the Kinetics-600 or virtual/game dataset. For example, the category "read" may correspond to the categories reading book and reading newspaper in Kinetics-600.

Then, a video game real action dataset may be built with both domains. For the virtual domain, there may be a total of 2625 training videos and 749 validation videos. For the real-world domain, 100 videos may be randomly selected for each category to keep a similar scale of training data between real and virtual domains, and all the validation videos from the original Kinetics-600 setting may be used. There may be a total of 3000 videos for training and 3256 videos for validation. In addition, there may also be 542 videos for pure testing.

The proposed domain adaptation approaches may then be evaluated on a self-collected virtual dataset. In some examples, implementation may be based on the PyTorch framework. A ResNet-101 1116 model pre-trained on ImageNet raw video 1118 as the frame-level feature extractor may be utilized. Before feeding to the model, a fixed number of frame-level feature vectors with equal space in temporal direction for each video may be sampled. For adequate comparison, twenty-five frames may be sampled for testing by following a common protocol in action recognition. For training, only five frames may be sampled given any limitations of computation resources. For optimization, the initial learning rate may be 0.1, and a learning-rate-decreasing strategy may be followed. A stochastic gradient descent (SGD) may be used as the optimizer with the momentum and weight decay as 0.9 and $1 \times 10^{-4}$. The batch size may be 512, where half may be from the labeled source data and half may be from the unlabeled target data.

Then, an experiment protocol of unsupervised domain adaptation may be followed and have the following experiment settings (where all the settings may be tested on the virtual validation set): Oracle, training with labeled virtual training set without any domain adaptation approach; Source only, training with labeled real action training set without any domain adaptation approach; Discrepancy-based domain adaptation, training with labeled real action training set and unlabeled virtual training set with the discrepancy-based domain adaptation approach; Adversarial-based domain adaptation, training with labeled real action training set and unlabeled virtual training set with the adversarial-based domain adaptation approach; and normalization-based domain adaptation, training with labeled real action training set and unlabeled virtual training set with the normalization-based domain adaptation approach.

Example results are shown in FIG. 12. The difference between the Oracle 1200 and source-only setting 1202 is the domain used for training. The Oracle setting can be regarded as the upper limit without domain shift problems in the first place, while the source-only setting shows the lower limit which directly applies the model trained with the data from different domains. The accuracy difference is fifty percent as shown. FIG. 12 also shows that each of the three domain adaptation approaches 1204 disclosed herein can mitigate the domain shift problem. Among them, the normalization-based domain adaptation has the best performance in this example, boosting the accuracy by 9.2%.

Domain adaptation for emotion recognition will now be discussed in further detail. Multimodal emotion recognition accuracy may be improved given limited user-specific audio and video samples. User adaptation may help with deep learning based emotion recognition accuracy using, e.g., audio only, video only, or both audio and video data together, with a user adaptation structure fitting into a generic domain adaptation framework in accordance with present principles.

Figure 14:
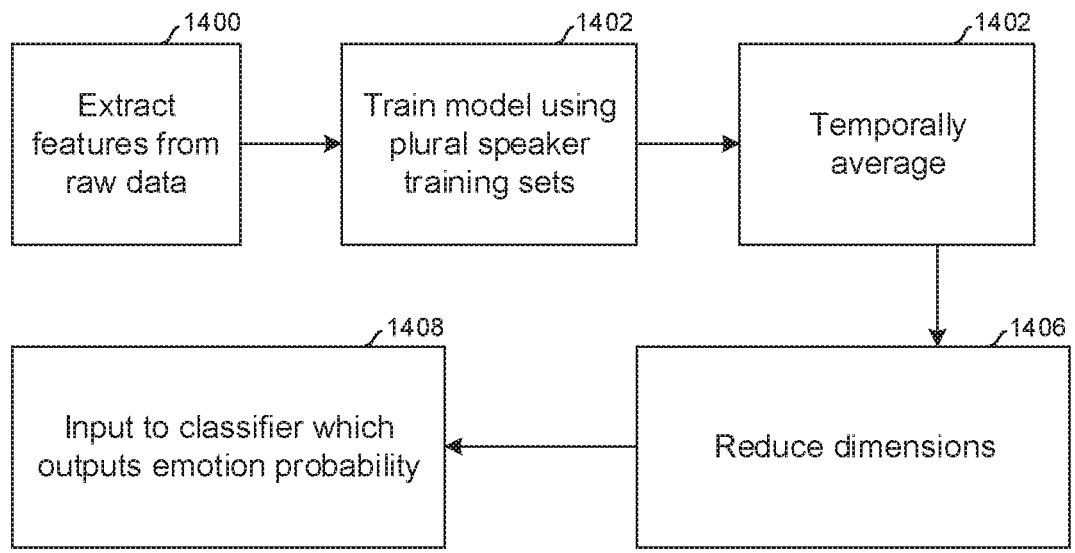

The baseline model structure for this example is depicted in FIG. 13, with further reference being made to the logic reflected in the flow chart of FIG. 14. The same model structure may be used for audio and video emotion recognition.

First, sequence of features 1300 (FIG. 13) may be extracted from raw data 1302, as reflected in block 1400 of FIG. 14. A speaker independent (SI) model 1304 may then be trained by plural speaker training datasets, as reflected in block 1402 of FIG. 14. The model structure may contain a stack of three bidirectional long short-term memory (BLSTM) layers 1306, and each layer 1306 may have 512 cells per direction. The features may be sent to the model frame by frame, and at block 1404 of FIG. 14 a temporal average layer 1308 may take the temporal average of the last LSTM layer hidden states as the utterance embedding. A fully connected layer 1310 may then be used to reduce the 1,024 dimensional embedding to 256 dimensions at block 1406 and then passed through a softmax classifier 1312 at block 1408 to convert the embedding to posterior emotion probabilities. The model may be trained by minimizing cross entropy error.

Accordingly, a separate model may be trained using audio and video data. During testing, each audio and video test data pair may be aligned for the same utterance in a preprocessing step. For each pair, emotion posterior probabilities may be computed from the two models, and averaged to obtain the final probability for decision making. This method may be referred to as "decision fusion".

Figure 16:
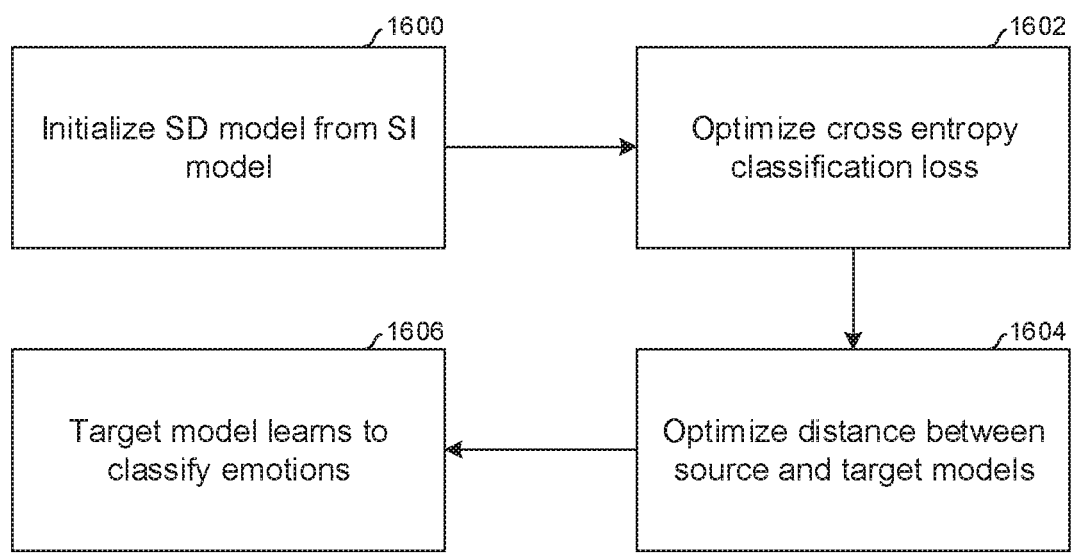
Figures 15, 17:
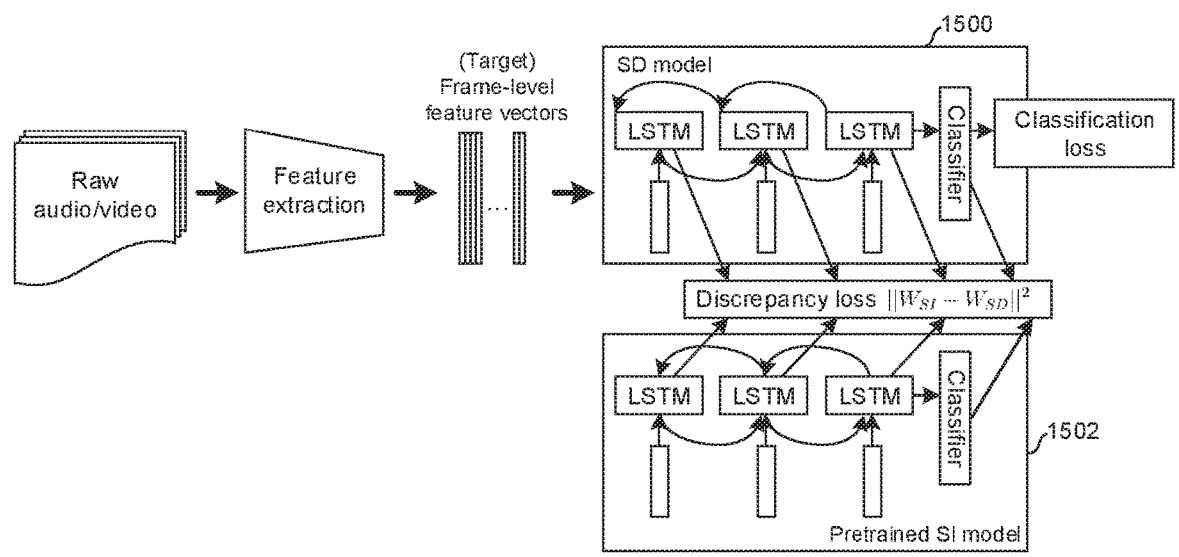

The user adaptation structure for this example is depicted in FIG. 15, with further reference being made to the logic reflected in the flow chart of FIG. 16. To adapt a pretrained SI model to a new user using limited adaptation data from this new speaker, a speaker dependent (SD) model 1500 (top branch) may be initialized from the SI model 1502 at block 1600 of FIG. 16. For user adaptation, practical application may sometimes mean that only the target (new user) adaptation data can be used during adaptation. Therefore, source data (many speakers used for training the SI model) may not be used as in the generic structure.

The loss function may include the sum of two terms, with one being the cross entropy classification loss defined for target domain data and another being the model parameter L2 distance between the source and target models, which may be analogous to the discrepancy loss in the generic structure. By jointly optimizing these two terms at blocks 1602 and 1604, respectively, the target model may learn to classify emotions correctly for each new user at block 1606 and may also avoid being adapted too far from the source model. The user adaptation structure in FIG. 15 may thus modify the general structure owing to, e.g., only the target domain data being used so that the classification error may be defined only for the target data. The user adaptation structure may also modify the general structure via the discrepancy loss taking a specific form, which may be the L2-norm between the source and target models.

As an example in accordance with present principles, eighty four speakers' audio emotional recordings may be collected for training the audio SI model. For testing, another five speakers may be used who did not appear in the training set. There may be ten emotion classes in the database. They may be merged into six classes, including happy, angry, sad, fear, surprise, other (including, e.g., excited, bored, neutral, disappointed, disgusted) and the unweighted accuracy may be reported, which may be computed as the average of the individual accuracy of the six classes. For video data, 114 speakers may be collected for training. For testing, the same five-speaker test set may be used in which audio and video has been aligned for each utterance.

Then, to do user adaptation, up to 150 utterances may be randomly selected for each of the five test speakers as the largest adaptation set. The remaining utterances may be used for testing. The five test speakers may have 2661 utterances in total, so after removing 150 adaptation utterances for each speaker, there may still be 1911 utterances for testing, which may make the results statistically meaningful in this example.

The number of adaptation data for each speaker may also be varied from five to 150 utterances. To compare results, all the smaller adaptation sets may be selected from the 150 utterances so that the test set may be the same.

Using the adaptation data, the audio and video models may be adapted separately and, at test time, individual model performance may be tested as well as decision fusion performance. Forty dimension log-mel filterbank features for audio may be used, and frame energy appended, first and second order deltas (123 dimensions in total). The audio frame length may be 25 ms and shifted every 10 ms. The video features may be extracted from the last layer (1024 dimensions) of a VGG model for each frame. The VGG model may be pretrained on the FERPlus dataset, which is a dataset for facial expression recognition. 136 dimension landmark facial points may also be appended to each frame.

For model training and adaptation, a minibatch size of 40 utterances/videos may be used, with an Adam optimizer to minimize the loss function. The initial learning rate when training the SI model may be set to 0.001, and multiplied by 0.1 when the classification accuracy has degraded on a development set. For adaptation, the learning rate may be fixed at 0.001, the audio model may be adapted for 5 epochs, and the video model may be adapted for 25 epochs on the adaptation set.

FIG. 17 shows a table of the example 6-class emotion recognition accuracy on the test set, before and after user adaptation. The SI_A, SI_V and SI_AV refer to the SI model performance, using audio only, video only and decision fusion. Similarly, the SD_A, SD_V and SD_AV show the results after adaptation. It may be appreciated that for each modality alone, user adaptation may improve the baseline performance and more adaptation data yields better recognition accuracy. Also, the decision fusion may provide better accuracy than using only single modality.

Figure 18:
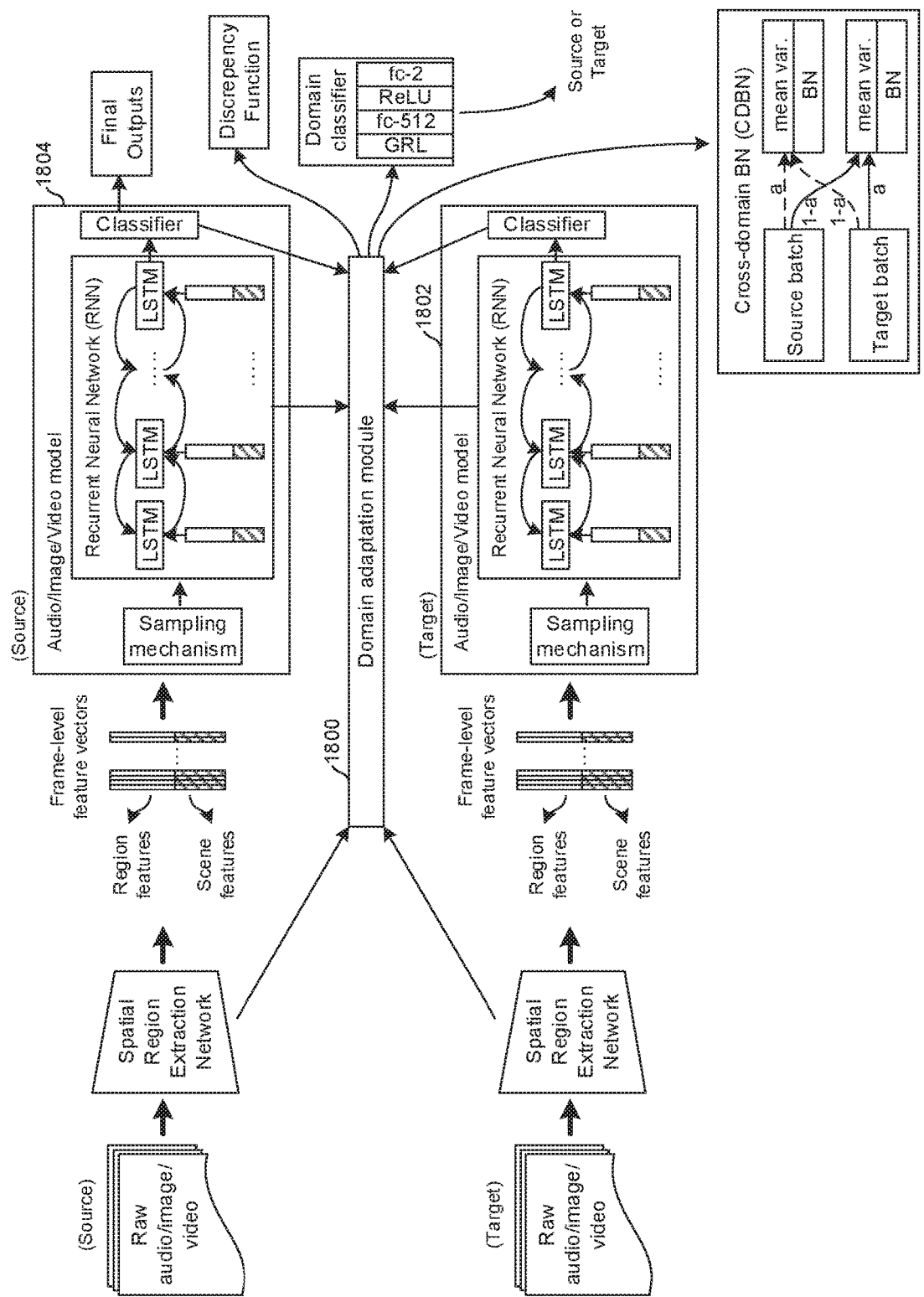

Moving on to FIG. 18, it shows all three domain adaptation methods being used together by a domain adaptation module 1800 in accordance with present principles to optimize a first (target) domain 1802 that is derived from a second (source) domain 1804.

As may be appreciated from the foregoing detailed description, present principles thus improve the adaptation and training of neural networks through the technological solutions described herein.

It will be appreciated that whilst present principals have been described with reference to some example embodiments, these are not intended to be limiting, and that various alternative arrangements may be used to implement the subject matter claimed herein.

What is claimed is:

1. An apparatus, comprising: at least one processor configured with instructions executable by the at least one processor to: access a first neural network, the first neural network being associated with a first data type; access a second neural network, the second neural network being associated with a second data type different from the first data type; provide, as input, first training data to the second neural network; select a first layer, the first layer being a hidden layer of the second neural network; identify a spatial output from the first layer, the spatial output being generated based on the first training data; using a third neural network, determine whether the spatial output from the first layer is from the first neural network, the third neural network being different from the first and second neural networks; based on a determination that the spatial output from the first layer is not from the first neural network, adjust one or more weights of the first layer, identify a temporal output from a second layer, the temporal output being generated based on the first training data, the second layer being a hidden layer of the second neural network; using a fourth neural network, determine whether the temporal output from the second layer is from the first neural network, the fourth neural network being different from the first, second, and third neural networks; and based on a determination that the temporal output from the second layer is not from the first neural network, adjust one or more weights of the second layer.

2. The apparatus of claim 1, wherein the instructions are executable by the at least one processor to: initially establish the second neural network by a copying of the first neural network.

3. The apparatus of claim 1, wherein the instructions are executable by the at least one processor to: based on a determination that the spatial output from the first layer is from the first neural network, decline to adjust one or more weights of the first layer.

4. The apparatus of claim 3, wherein the spatial output is a first spatial output, and wherein the instructions are executable by the at least one processor to: based on a determination that the first spatial output from the first layer is from the first neural network, select a third layer, the third layer also being a hidden layer of the second neural network; identify a second spatial output, the second spatial output being from the third layer; using the third neural network, determine whether the second spatial output is from the first neural network; and based on a determination that the second spatial output is not from the first neural network, adjust one or more weights of the third layer.

5. The apparatus of claim 4, wherein the first and third layers of the second neural network are selected randomly.

6. The apparatus of claim 1, wherein the instructions are executable by the at least one processor to: prior to using the third neural network to determine whether the spatial output from the first layer is from the first neural network, adjust one or more weights of one or more layers of the third neural network so that the third neural network learns to correctly classify spatial outputs from layers of either of the first neural network and the second neural network.

7. The apparatus of claim 6, wherein the third neural network operates in an unsupervised mode to, using labeled data, learn to correctly classify spatial outputs from layers of either of the first neural network and the second neural network.

8. A method, comprising: accessing a first neural network, the first neural network being associated with a first data type; accessing a second neural network, the second neural network being associated with a second data type different from the first data type; providing, as input, first training data to the second neural network; selecting a first layer, the first layer being a hidden layer of the second neural network; identifying a spatial output from the first layer, the spatial output being generated based on the first training data; using a third neural network, determining whether the spatial output from the first layer is from the first neural network, the third neural network being different from the first and second neural networks; based on determining that the spatial output from the first layer is not from the first neural network, adjusting one or more weights of the first layer; identifying a temporal output from a second layer, the temporal output being generated based on the first training data, the second layer being a hidden layer of the second neural network; using a fourth neural network, determining whether the temporal output from the second layer is from the first neural network, the fourth neural network being different from the first, second, and third neural networks; and based on determining that the temporal output from the second layer is not from the first neural network, adjusting one or more weights of the second layer.

9. The method of claim 8, comprising: determining, using the third neural network, whether the spatial output from the first layer is from the first neural network at least in part by using the third neural network to identify the spatial output from the first layer as pertaining to the first data type.

10. The method of claim 8, comprising: based on determining that the spatial output from the first layer is from the first neural network, declining to adjust one or more weights of the first layer.

11. The method of claim 10, wherein the temporal output is a first temporal output, and wherein the method comprises: based on determining that the first temporal output from the second layer is from the first neural network, selecting a third layer, the third layer also being a hidden layer of the second neural network; identifying a second temporal output from the third layer; using the fourth neural network, determining whether the second temporal output is from the first neural network; and based on determining that the second temporal output is not from the first neural network, adjusting one or more weights of the third layer.

12. The method of claim 8, wherein the first layer is selected based on a command from a human supervisor.

13. The method of claim 8, wherein the instructions are executable by the at least one processor to: prior to using the fourth neural network to determine whether the temporal output from the second layer is from the first neural network, adjusting one or more weights of one or more layers of the fourth neural network so that the fourth neural network learns to correctly classify temporal outputs from layers of either of the first neural network and the second neural network.

14. The method of claim 8, wherein the fourth neural network operates in unsupervised mode to, using labeled data, learn to correctly classify temporal outputs from layers of either of the first neural network and the second neural network.

15. The method of claim 8, comprising: initially establishing the second neural network by a copying of the first neural network.

16. The apparatus of claim 1, wherein the third neural network and the fourth neural network are both domain classifiers.

17. The apparatus of claim 1, wherein the first and second layers are different layers.

18. The method of claim 8, wherein the third neural network and the fourth neural network are both domain classifiers.

19. The method of claim 8, wherein the first and second layers are different layers.

* * * * *